(12) United States Patent
Zheng et al.

(10) Patent No.: US 9,256,378 B2
(45) Date of Patent: Feb. 9, 2016

(54) DEDUPLICATING DATA BLOCKS IN A STORAGE SYSTEM

(71) Applicant: NetApp, Inc., Sunnyvale, CA (US)

(72) Inventors: Ling Zheng, Sunnyvale, CA (US);
Blake H. Lewis, Los Altos Hills, CA (US); Daniel W. Ting, Palo Alto, CA (US); Robert M. English, Menlo Park, CA (US); Stephen L. Manley, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 266 days.

(21) Appl. No.: 13/901,385

(22) Filed: May 23, 2013

(65) Prior Publication Data

US 2013/0262805 A1    Oct. 3, 2013

Related U.S. Application Data

(63) Continuation of application No. 11/105,895, filed on Apr. 13, 2005, now Pat. No. 8,849,767.

(51) Int. Cl.
*G06F 17/30* (2006.01)
*G06F 3/06* (2006.01)

(52) U.S. Cl.
CPC ............ *G06F 3/0641* (2013.01); *G06F 3/0608* (2013.01); *G06F 3/0683* (2013.01)

(58) Field of Classification Search
CPC ............... G06F 3/0641; G06F 3/0608; G06F 17/30156; G06F 3/067; G06F 11/1453
USPC ........................................................ 707/204
See application file for complete search history.

(56) References Cited

U.S. PATENT DOCUMENTS

| | | | |
|---|---|---|---|
| 4,695,949 A | 9/1987 | Thatte et al. | |
| 4,809,168 A | 2/1989 | Hennessy et al. | |
| 5,680,611 A | 10/1997 | Rail et al. | |
| 5,761,678 A * | 6/1998 | Bendert et al. | 707/639 |
| 6,144,965 A | 11/2000 | Oliver | |
| 6,453,354 B1 * | 9/2002 | Jiang et al. | 709/229 |
| 6,658,423 B1 | 12/2003 | Pugh et al. | |
| 6,789,156 B1 | 9/2004 | Waldspurger | |
| 6,928,526 B1 | 8/2005 | Zhu et al. | |
| 7,065,619 B1 | 6/2006 | Zhu et al. | |
| 2002/0166061 A1 | 11/2002 | Falik et al. | |
| 2002/0169934 A1 | 11/2002 | Krapp et al. | |
| 2003/0018878 A1 | 1/2003 | Dorward et al. | |

(Continued)

OTHER PUBLICATIONS

Hong et al. "Duplicate Data Ellimination in a SAN File System", 2004.*

(Continued)

*Primary Examiner* — Yuk Ting Choi
(74) *Attorney, Agent, or Firm* — Gilliam IP PLLC; Gregg Peacock

(57) ABSTRACT

A method for sharing data blocks in a hierarchical file system in a storage server includes allocating a plurality of data blocks in the file system, and sharing data blocks in the file system, without using a persistent point-in-time image, to avoid duplication of data blocks. A method for identifying data blocks that can be shared includes computing a fingerprint for each of multiple data blocks to be written to a storage facility and storing the fingerprint with information identifying the data block in an entry in a set of metadata. The set of metadata is used to identify data blocks which are duplicates.

21 Claims, 13 Drawing Sheets

(56) References Cited

U.S. PATENT DOCUMENTS

| | | |
|---|---|---|
| 2003/0182317 A1 | 9/2003 | Kahn et al. |
| 2005/0066095 A1 | 3/2005 | Mullick et al. |
| 2005/0152192 A1* | 7/2005 | Boldy et al. ............. 365/189.05 |
| 2006/0282457 A1* | 12/2006 | Williams ...................... 707/102 |

OTHER PUBLICATIONS

"*EMC Centers Content Addressed Storage System, Innovations for the Content Wave*", 2003, pp. 1-4, EMC Corporation, Hapkinton, Massachusetts.

Jarad Carleton, "*Solutions for the Automotive Industry in Meeting the Legislated Demands of Record Retention and Accessibility*", 2003, p. 1-9, Frost & Sullivan, San Jose, CA.

Office Action from U.S. Appl. No. 11/105,895 mailed Aug. 27, 2007, 23 pages.

Final Office Action from U.S. Appl. No. 11/105,895 mailed Feb. 5, 2008, 22 pages.

Office Action from U.S. Appl. No. 11/105,895 mailed Jul. 3. 2008, 25 pages.

Final Office Action from U.S. Appl. No. 11/105,895 mailed Dec. 2, 2008, 24 pages.

Office Action from U.S. Appl. No. 11/105,895 mailed Jan. 29, 2010, 28 pages.

Office Action from U.S. Appl. No. 11/105,895 mailed Jul. 8, 2010, 33 pages.

Denehy, et al. "Duplicate Management for Reference Data", *IBM Research Report*, Oct. 7, 2003.

\* cited by examiner

DEDUPLICATING DATA BLOCKS IN A STORAGE SYSTEM

This application is a continuation of, and claims the benefit of priority of, application Ser. No. 11/105,895, filed Apr. 13, 2005, now U.S. Pat. No. 8,849,767.

FIELD OF THE INVENTION

At least one embodiment of the present invention pertains to data storage systems, and more particularly, to a technique for identifying and eliminating duplicate data blocks and for sharing data blocks managed by a file system.

BACKGROUND

In a data storage system it is desirable to use storage space as efficiently as possible, to avoid wasting storage space. One type of system in which this concern can be particularly important is a storage server, such as a file server. File servers and other types of storage servers often are used to maintain extremely large quantities of data. In such systems, efficiency of storage space utilization is critical.

Files maintained by a file server generally are made up of individual blocks of data. A common block size is four kilobytes. In a large file system, it is common to find duplicate occurrences of individual blocks of data. Duplication of data blocks may occur when, for example, two or more files have some data in common or where a given set of data occurs at multiple places within a given file has. Duplication of data blocks results in inefficient use of storage space.

A technique which has been used to address this problem in the prior art is referred to as "file folding". The basic principle of file folding is to allow new data of a file in the active file system to share a disk block with the old data of the file in a persistent image if the new data are identical to the old data. By using file folding, ideally only one occurrence of each unique data block will exist in a file system. This technique has been implemented in file servers, known as Filers, made by Network Appliance, Inc., of Sunnyvale, Calif. Specifically, Network Appliance Filers are capable of acquiring a Snapshot™ of a specified set of data. A "Snapshot" is a persistent, read-only image of the storage system, and more particularly, of the active file system, at a particular instant in time. If a block within a file that has been "Snapshotted" is modified after the Snapshot, rather than creating another complete (modified) copy of the file in the active file system, the Filer only creates the modified block for that file in the active file system; for each unmodified block, the Filer simply gives the file a pointer to the corresponding block in the Snapshot. In this way, the unmodified blocks in the Snapshot become shared between the Snapshot and the active file system. This technique is described in greater detail in U.S. Patent Application Publication no. 2003/0182317, entitled, "File Folding Technique," filed on Mar. 22, 2002 by A. Kahn et al., and assigned to the assignee of the present application.

File folding does help to more efficiently use storage space. However, it is desirable to reduce data duplication in an active file system without having to rely upon a persistent point-in-time image (e.g., a Snapshot). It is also desirable to reduce data duplication regardless of the location of the data in the file system.

Another prior art approach to avoiding duplication of data in a storage system involves computing a hash value for every file that is stored. For example, in one known prior art system, which does not use a traditional (hierarchical) file system approach, a storage server is used to store data on behalf of an application server or other client. When the application server wants the storage server to store a particular file, the application server computes a hash value for the file and sends the storage server a write request containing the file and the hash value.

The storage server uses hash values of files to help reduce data duplication. More specifically, the storage server maintains a database containing a mapping of all of the stored files to their respective hash values. When the storage server receives a write request with a hash value, it searches for a match of that hash value in its database. If no match is found, the storage server concludes that it does not have a copy of that file already stored, in which case the storage server requests the file from the application server. If a match of the hash value is found, however, the storage server concludes that it already has a copy of that file stored and, therefore, does not have to request the file from the application server.

This method of using hash values employs a proprietary set of protocols and semantics, which are very different from those used in a traditional (hierarchical) file system. Further, the need to compute a hash value for every read or write and for every data block adversely affects performance, particularly during reads. In addition, every time a file is modified, the file has to be stored as a new file with a new hash value associated with it. Moreover, this approach involves complicated cleanup issues with regard to determining when particular blocks can be freed.

SUMMARY OF THE INVENTION

The present invention includes a method and apparatus for sharing data blocks in a hierarchical file system in a storage server. In at least one embodiment, the method includes allocating a plurality of data blocks in the hierarchical file system, and sharing data blocks in the hierarchical file system, without using a persistent point-in-time image, to avoid duplication of data blocks.

Another aspect of the invention is a method and an apparatus for identifying data blocks that can be shared. In at least one embodiment, the method includes computing a fingerprint for each of multiple data blocks to be written to a storage facility and storing the fingerprint with information identifying the data block in an entry in a set of metadata. The method further includes using the set of metadata to identify data blocks which are duplicates.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for identifying and eliminating duplicate data blocks and for sharing data blocks in a hierarchical file system are described. As explained in greater detail below, the technique introduced herein allows sharing of data blocks in a hierarchical file system of a storage server to avoid duplication of data blocks anywhere in the file system, without using any persistent point-in-time image (PPI), such as a Snapshot. The technique also does not require any client-side behavioral/design changes or appreciably impact read/write performance in a negative way.

In certain embodiments of the invention, the sharing of data blocks involves maintaining a reference count file that contains, for each data block in the file system, a reference count indicating the number of references to the data block. Shared data blocks are blocks which are the target of two or more references. Data blocks that can be shared are identified by computing a fingerprint for each data block to be written to a storage facility and storing the fingerprint with information identifying the data block in an entry in a metadata file, as the data block is being written to the storage facility. A "fingerprint", as the term is used herein, is any information derived from the content of a data block, that might uniquely identify the data block. The entries in the metadata file are then sorted by fingerprint, and the sorted metadata file is used to identify data blocks which are duplicates. Duplicate data blocks are freed for reuse, and their remaining counterparts which are not freed are shared to the extent possible.

Figure 1:
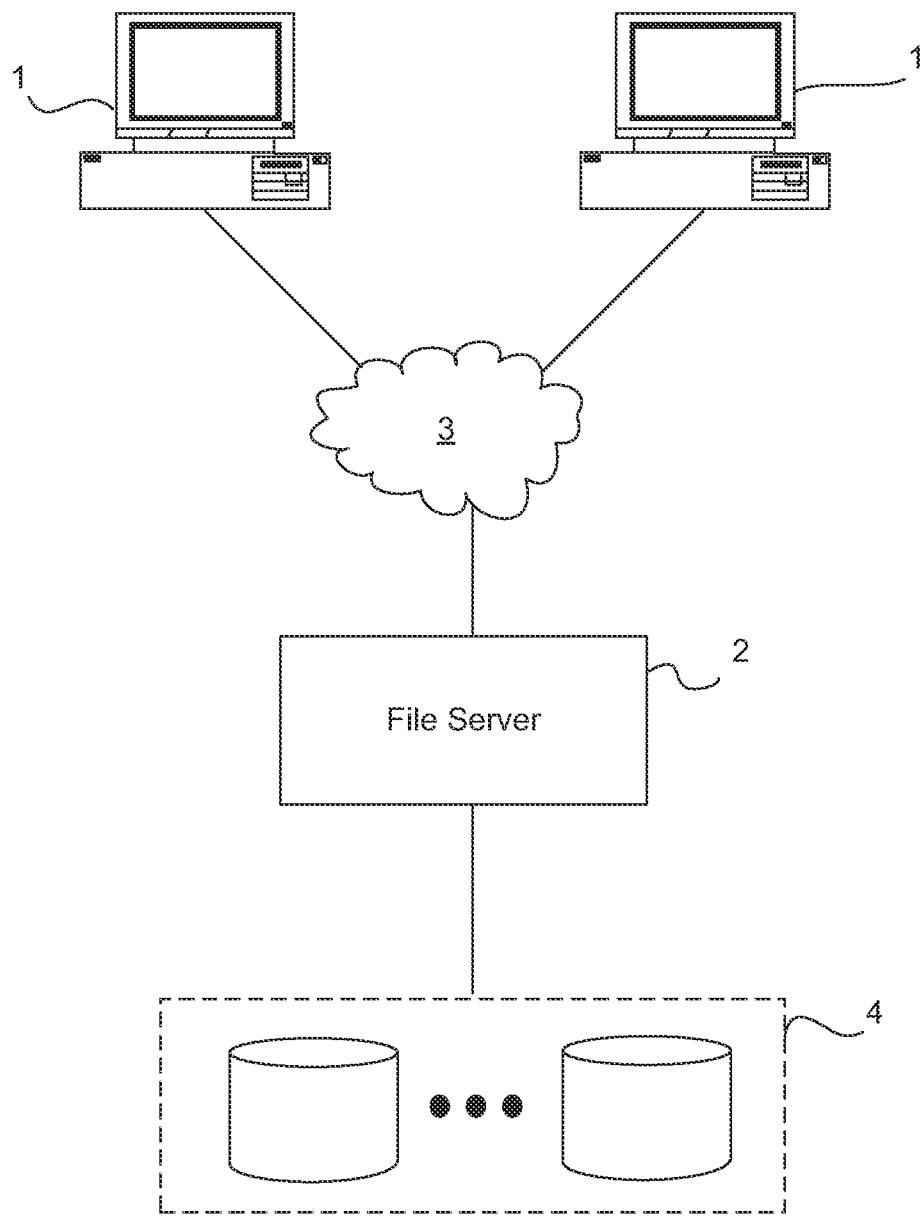
FIG. 1 illustrates an example of a network environment which includes a file server.

One example of a system in which this technique can be implemented is a file server system. FIG. 1 shows an example of a network environment in which such a system can be employed. In FIG. 1, a file server 2 is coupled locally to a storage subsystem 4 which includes multiple mass storage devices, and to a set of clients 1 through a network 3, such as a local area network (LAN). Each of the clients 1 may be, for example, a conventional personal computer (PC), workstation, or the like. The storage subsystem 4 is managed by the file server 2. The file server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 can be organized as a Redundant Array of Inexpensive Disks (RAID), in which case the file server 2 accesses the storage subsystem 4 using one or more well-known RAID protocols.

The file server 2 may be a file server designed for use in a network attached storage (NAS) mode (otherwise referred to as a "filer"), as is henceforth assumed in this description. The technique introduced herein can be implemented in the file server 2, or in other devices, as described below. The technique can also be adapted for use in other types of storage systems, however, such as storage servers which provide clients with block-level access to stored data, or processing systems other than storage servers.

Figure 2:
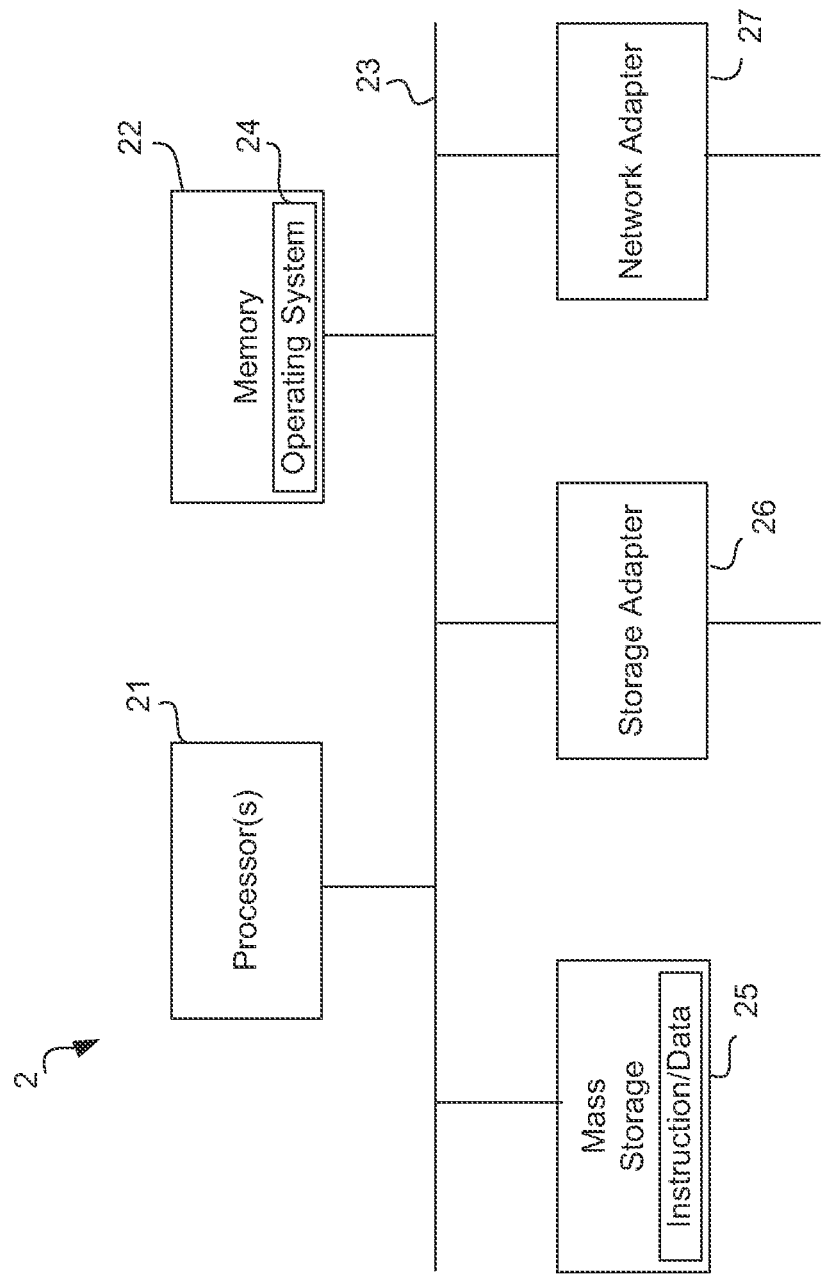
FIG. 2 is a high-level block diagram showing an example of the architecture of a file server.

FIG. 2 is a block diagram showing an example of the architecture of the file server 2 at a high level. Certain standard and well-known components which are not germane to the present invention are not shown. The file server 2 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the file server 2 and, thus, control its overall operation. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory of the file server 2. Memory 22 represents any form of random access memory (RAM), read-only memory (ROM), flash memory, or the like, or a combination of such devices. Memory 22 stores (among other things) the storage server's operating system 24, which can implement the technique introduced herein.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the file server 2 to access the storage subsystem 4 and may be, for example, a Fibre Channel adapter or a SCSI adapter. The network adapter 27 provides the file server 2 with the ability to communicate with remote devices, such as the clients 1, over a network and may be, for example, an Ethernet adapter, a Fibre Channel adapter, or the like.

Figure 3:
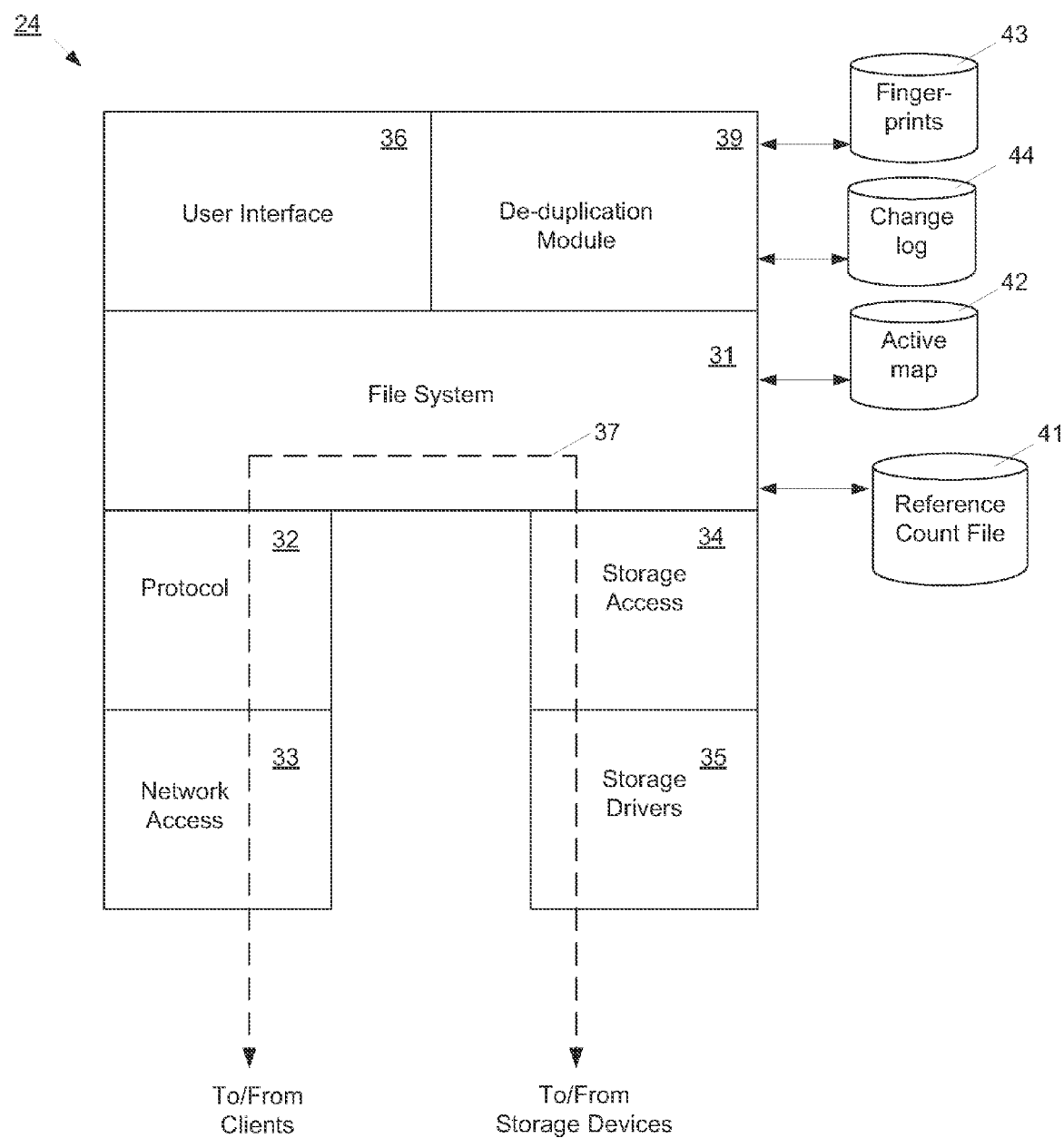
FIG. 3 shows an example of the architecture of the operating system of a file server.

FIG. 3 shows an example of the architecture of the operating system 24 of the file server 2. As shown, the operating system 24 includes several software modules, or "layers". These layers include a file system 31. The file system 31 is application-layer software which imposes a hierarchical structure on the data stored in the storage subsystem 4 (i.e., a hierarchy of files and directories) and which services read/write requests from clients 1. Logically "under" the file system 31, the operating system 24 also includes a protocol layer 32 and an associated network access layer 33, to allow the file server 2 to communicate over the network 3 (e.g., with clients 1). The protocol 32 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP), and serves to translate read/write requests from clients into a format understandable by the file system 31. The network access layer 33 includes a driver or drivers to implement one or more lower-level protocols to communicate over the network, such as Ethernet, Fibre Channel or iSCSI.

Also logically under the file system 31, the operating system 24 includes a storage access layer 34 and an associated storage driver layer 35, to allow the file server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or small computer system interface (SCSI). Also shown in FIG. 3 is the path 37 of data flow, through the operating system 24, associated with a read or write operation.

The operating system 24 also includes a user interface module 36 and a de-duplication module 39 logically on top of the file system 31. The user interface module may implement a command line interface and/or a graphical user interface, which may be accessed by a network administrator from an attached administrative console or through the network 3. The de-duplication module 39 is an application layer which identifies and eliminates duplicate data blocks ("de-duplication") and triggers data block sharing in accordance with the technique introduced herein.

The operating system 24 also includes, or has access to, three databases that are used to implement the sharing technique, namely, a reference count file 41, an Active map 42 and a fingerprints database 43. The reference count file 41 contains an entry for each data block maintained by the file server 2, wherein each entry includes a value, REFCOUNT, indicating the number of references to that data block. For example, a data block which is shared by two files would have a REFCOUNT value of 2. A data block can be shared by more than two files (or other entities), in which case the REFCOUNT value would reflect this accordingly. A data block which is allocated but not shared would have a REFCOUNT value of 1. A data block which is not yet allocated would have a REFCOUNT value of 0. In certain embodiments of the invention, the REFCOUNT value for each data block is a two-byte binary value, which allows each data block to be the target of up to $2^{16}-1$ references.

The Active map 42 is a bitmap of all data blocks managed by the file server 2, i.e., one bit per data block. The bit for a given data block is set in the Active map 42 if the data block is allocated and cleared if the data block is free to be used. The Active map 42 is used during allocation of blocks to determine whether a block is free or not. The Active map 42 helps to improve performance by avoiding the need to read the reference count file 41 to identify free blocks; the reference count file 41 is much larger (and therefore takes longer to read) than the Active map 42. In an alternative embodiment, however, the Active map 42 and the reference count file 41 could be combined into a single file to identify each free block as well as to indicate the number of references to the data block.

The fingerprints database 43 is used by the de-duplication module 39 to store a fingerprint for each data block that is written to the storage subsystem 4. In this context, a "fingerprint" may be a checksum, for example. The fingerprints are used in a process for efficiently identifying duplicate data blocks, i.e., to identify data blocks that can be shared. This process is described below in detail.

Figure 4:
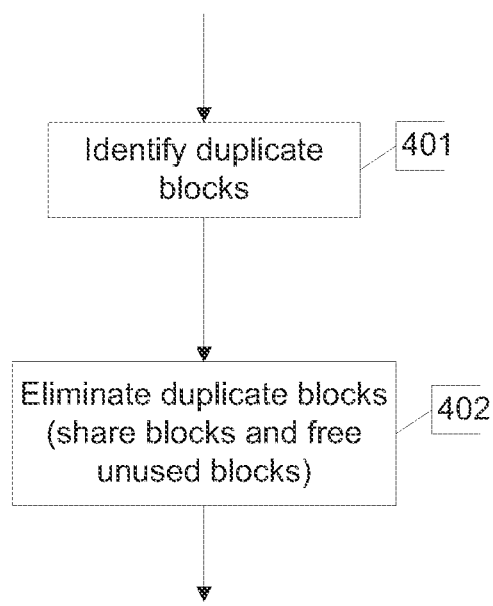
FIG. 4 is a flow diagram showing an overall process of a technique for identifying and eliminating duplicate data blocks and sharing data blocks.

FIG. 4 shows the overall process of the technique introduced herein at a high-level, according to certain embodiments of the invention. The first phase 401 is identifying duplicate data blocks. Once the duplicate data blocks are identified, the duplicates are eliminated at 402 so as to leave only one instance of each unique data block. This phase 402 includes sharing the remaining instance of each data block that was duplicated and freeing the (no longer used) duplicate data block(s). Phase 402 also involves updating the reference count file 41, Active map 42 and fingerprints database 43. This whole process may be triggered automatically at predetermined intervals or at predetermined times, or it may be triggered manually or in response to pre-specified events (such as deletion of a file) or in response to a pre-specified policy (such as a given number of new blocks having been collected).

The sharing technique will now be further described with reference to FIGS. 5, 6 and 7, according to certain embodiments of the invention. Assume for purposes of explanation that the active file system of a file server maintains two simple files, named Foo and Bar, shown in FIG. 5. File Foo contains two data blocks, and file Bar contains two data blocks. Each data block is identified in the file system by (among other things) its volume block number (VBN). A VBN identifies the logical block where the data is stored (since RAID aggregates multiple physical drives as one logical drive), as opposed to a physical block. A VBN should be distinguished from a disk block number (DBN) which identifies the physical block number within a disk in which the block is stored, or a file block number (FBN) which identifies the logical position of the data within a file. The two blocks of file Foo have VBN values of 1 and 2. VBN 1 contains the data, "A", while VBN 2 contains the data, "B". The two blocks of file Bar have VBN values of 3 and 4. VBN 3 contains the data, "C", while VBN 4 contains the data, "D".

For each VBN maintained by the file system, the reference count file 41 includes a value, REFCOUNT, indicating the number of references to that VBN. In the example of FIG. 5, for VBNs [1,2,3,4] the REFCOUNT values are [1,1,1,1], respectively, indicating that each VBN is the target of one reference.

Figure 5:
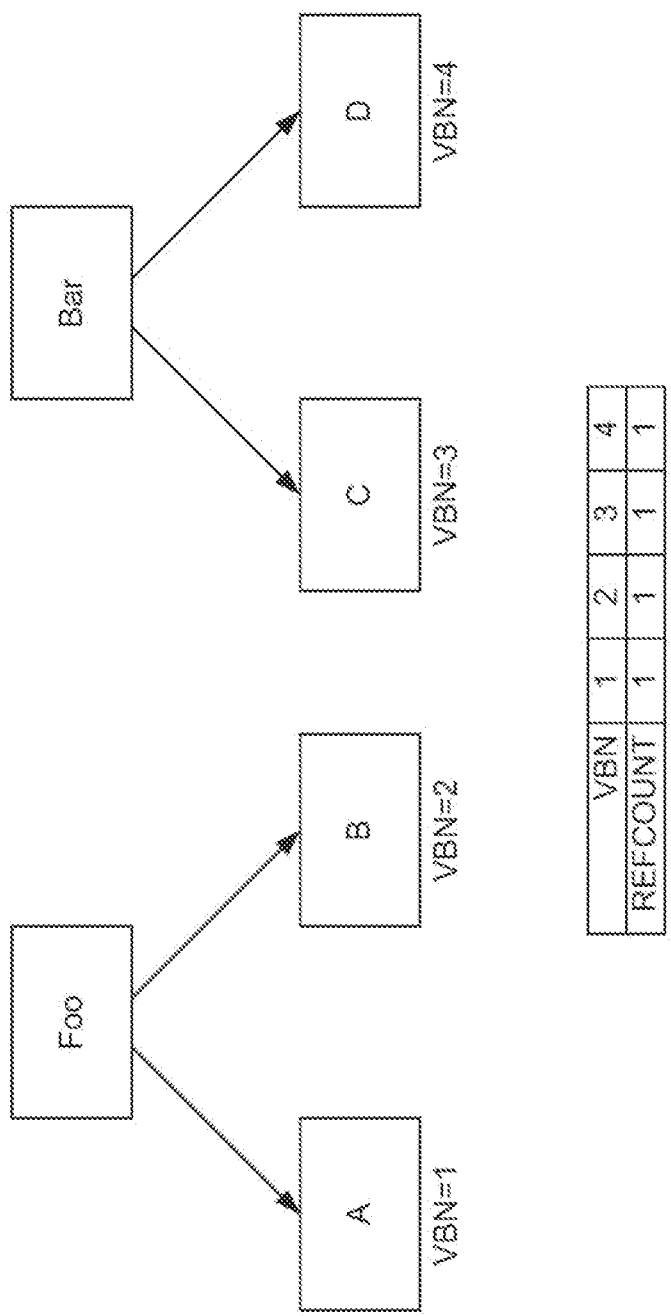
FIGS. 5 through 7 illustrate how the technique of FIG. 4 can be applied with respect to two files.
Figure 6:
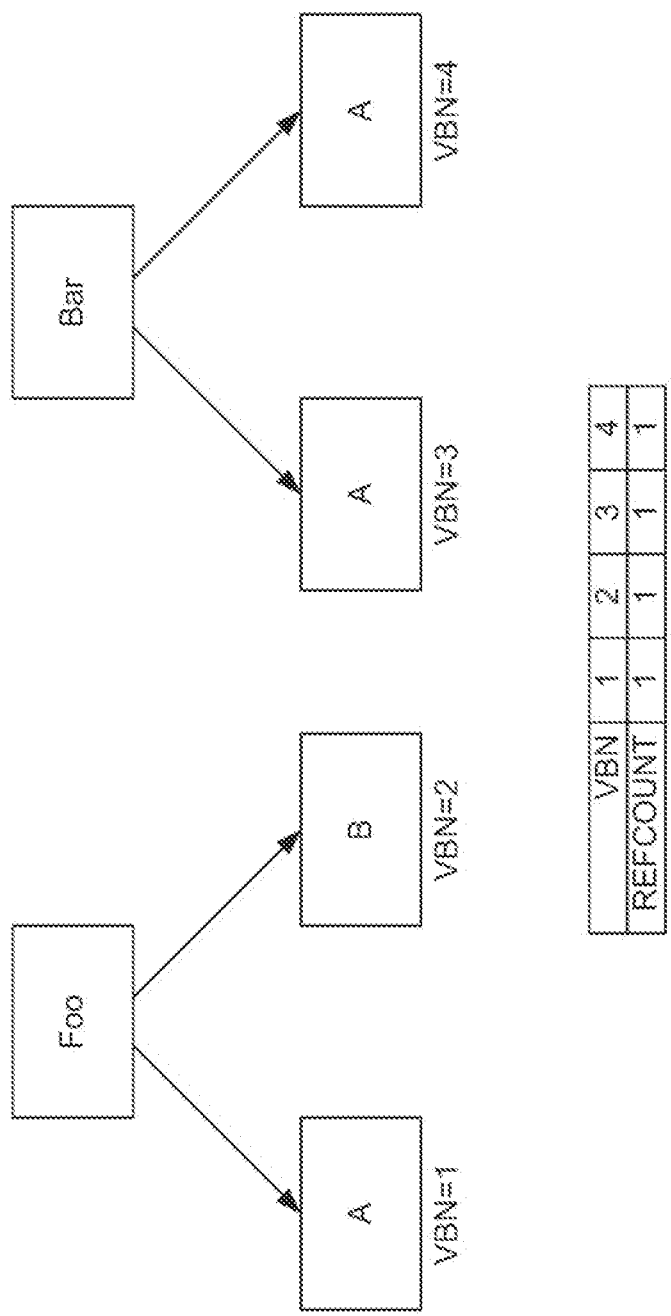

Refer now to FIG. 6, which is a variation of the example of FIG. 5, in which VBNs 3 and 4 of file Bar have the same data ("A") as VBN 1 of file Foo. That is, VBNs 3 are 4 are duplicates of VBN 1 and of each other. Initially, when a data block is allocated by the file system, its REFCOUNT value in the reference count file 41 is set equal to 1. Accordingly, before duplicate data blocks are identified in the example of FIG. 6, the REFCOUNT values for the example of FIG. 6 are the same as in FIG. 5, i.e., [1,1,1,1], as shown.

Figure 7:
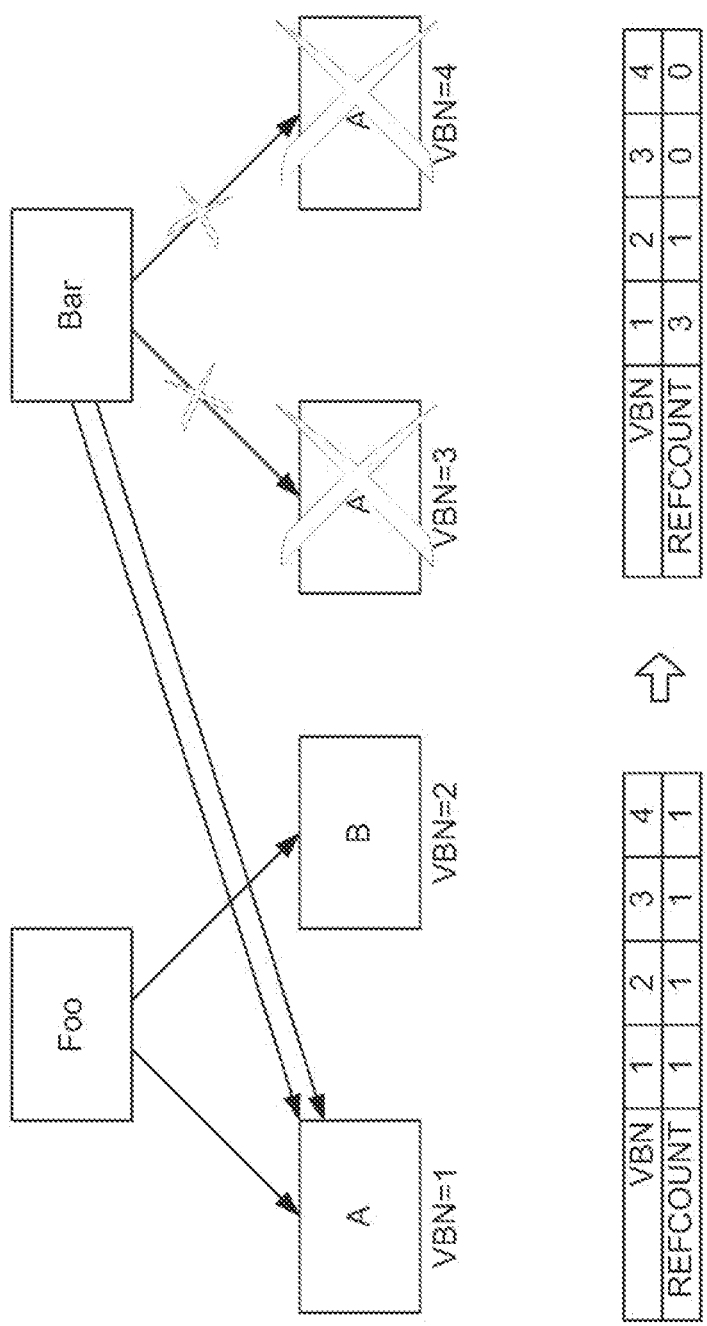

In contrast, FIG. 7 shows what the example of FIG. 6 would look like after duplicate data blocks has been identified and sharing is implemented. Sharing involves giving, to each entity which owns a shareable data block, a pointer to that data block. Accordingly, in the example of FIG. 7 this involves giving file Bar two pointers to VBN 1 (file Foo already had a pointer to VBN 1). The process also involves eliminating the duplicate data blocks, VBNs 3 and 4, and freeing them for reuse. Once this process is completed, the REFCOUNT values for VBNs [1,2,3,4] are adjusted to be [3,1,0,0], respectively, to reflect the fact that VBNs 3 and 4 have been freed and VBN 1 now has three references to it (i.e., VBN 1 is shared).

The reference count file 41 is continually updated to reflect events that affect these blocks. For example, if file Foo is now deleted, the REFCOUNT values for VBNs [1,2,3,4] would be adjusted to be [2,0,0,0], respectively, reflecting that VBN 2 has been freed in addition to VBNs 3 and 4. Note that VBN 1 has not been freed (i.e., its REFCOUNT value is not zero), since VBN 1 is still in use by file Bar; instead the REFCOUNT value for VBN 1 has been decremented from 3 to 2. If file Bar is now deleted, the REFCOUNT values for VBNs [1,2,3,4] would be adjusted to be [0,0,0,0], respectively.

The approach just described assumes that the file system adheres to the copy-on-write principle; that is, anytime a data block is modified, it is written to a different VBN, rather than modifying the data in place. Referring back to the example of FIG. 7, therefore, assume that a write request from a client causes the data "A" in file Bar to be changed to "F". In this case, VBN 1, which contains the data "A", is not modified. However, since the new data, "F", is written to a new logical and physical block, the REFCOUNT value for VBN 1 must still be updated. Hence, the REFCOUNT value for VBN 1 in this case would be decremented by one. In addition, the REFCOUNT value for whichever VBN is allocated to store the new data, "F", would be incremented by one.

It is possible to implement this technique even in a file system which does not impose copy-on-write in all instances. For example, the technique can be employed by requiring copy-on-write only when the REFCOUNT value for given data block is greater than one.

To avoid data inconsistencies, when a file which contains one or more shared blocks is modified, its REFCOUNT values and block pointers are updated in a single atomic transaction. This updating may be done, for example, during a "consistency point", i.e., when a set of accumulated write transactions are committed from temporary storage to persistent storage.

It is possible for data in the reference count file 41 to become corrupted, for any of various reasons. Therefore, it is prudent to have some way of ensuring consistency between the reference count file 41 and the actual state of the file system. One way this can be accomplished is scanned the entire active file system for consistency with the reference count file 41 before boot-up of the file system. This can include creating a separate, temporary reference count file in main memory of the file server 2, scanning all data blocks in the file system to identify shared data blocks, and updating the temporary reference count file to reflect any shared data blocks. The temporary reference count file is then compared to the regular (persistent, on-disk) reference count file 41 to determine whether they match. If they do not match, an inconsistency is identified, and appropriate corrective action is taken.

In addition, it may be desirable to allow this type of consistency check to be run while the file system is in operation. This can be done by creating the temporary reference count file on disk, so as not to consume main memory in the file server 2. In that case, however, if the user modifies a particular block while the consistency check is running, it is necessary to update both the temporary and the persistent reference count files.

Various other optimizations can be added to the above described technique. For example, a SHARED flag can be provided for each file in the file system, to indicate whether the file contains any shared blocks. The SHARED flag can be stored in a convenient location, such as in the file's inode (a container of metadata about the file, used by the file system), to allow fast determination of whether it is necessary to read the reference count file 41 when modifying a block. This avoids unnecessarily having to read the (large) reference count file 41 when the file includes no shared blocks. Similarly, another flag can be implemented for each volume in the storage system, to indicate whether the volume is allowed to implement block sharing. The benefit, as in the previous example, is avoiding the need to read the reference count file 41 in all cases.

Further, one or more counters can be implemented in the file system to track the total number of shared blocks. These counters can be used to provide an output to a user (e.g., a storage network administrator) indicating the amount of disk space being saved as a result of block sharing.

There are many possible advantageous uses of the above-described technique. For example, this technique allows any individual file to be copied by simply copying its block pointers and incrementing the REFCOUNT values of all of its data blocks by one, without actually creating copies of the data blocks. In this way, it is possible to create a single-file PPI, i.e., a persistent point-in-time image of a particular file. In the event the file is modified after the PPI is taken, it is possible to revert the particular file back to the PPI as long as the PPI remains available.

Another advantage of the above-described technique is "file cloning" functionality. By copying the block pointers from one file to another file, it is possible to make a "clone" of the original file. At the time the clone is created, both the clone and the original share the same set of pointers. However, to users they are two completely independent files. If a user modifies a block, call it block A, in the original file (which is shared by the clone), the clone will be modified at the same time. Assuming copy-on-write is being used, the original file will get a new block, block A', and the clone will get another new block, block A", through two simultaneous copy-on-write operations.

Yet another advantage of the above-described technique is that a file system with shared data blocks can be easily converted to a file system without shared blocks, if desired. For example, when such an operation is desired, any data blocks whose REFCOUNTs are greater than one are simply copied out to new locations, the RECOUNTs of those data blocks are then each decremented by one, and block pointers are adjusted as necessary to point to the new instances of those blocks.

Still another advantage is that the above-described technique allows for efficient replication. When replicating a file system or a portion thereof, for example, shared blocks only need to be sent from the source to the destination once, thus making replication more bandwidth-efficient. In addition, the replicated file system will use less space than it would otherwise, just as with the original volumes.

Figure 8:
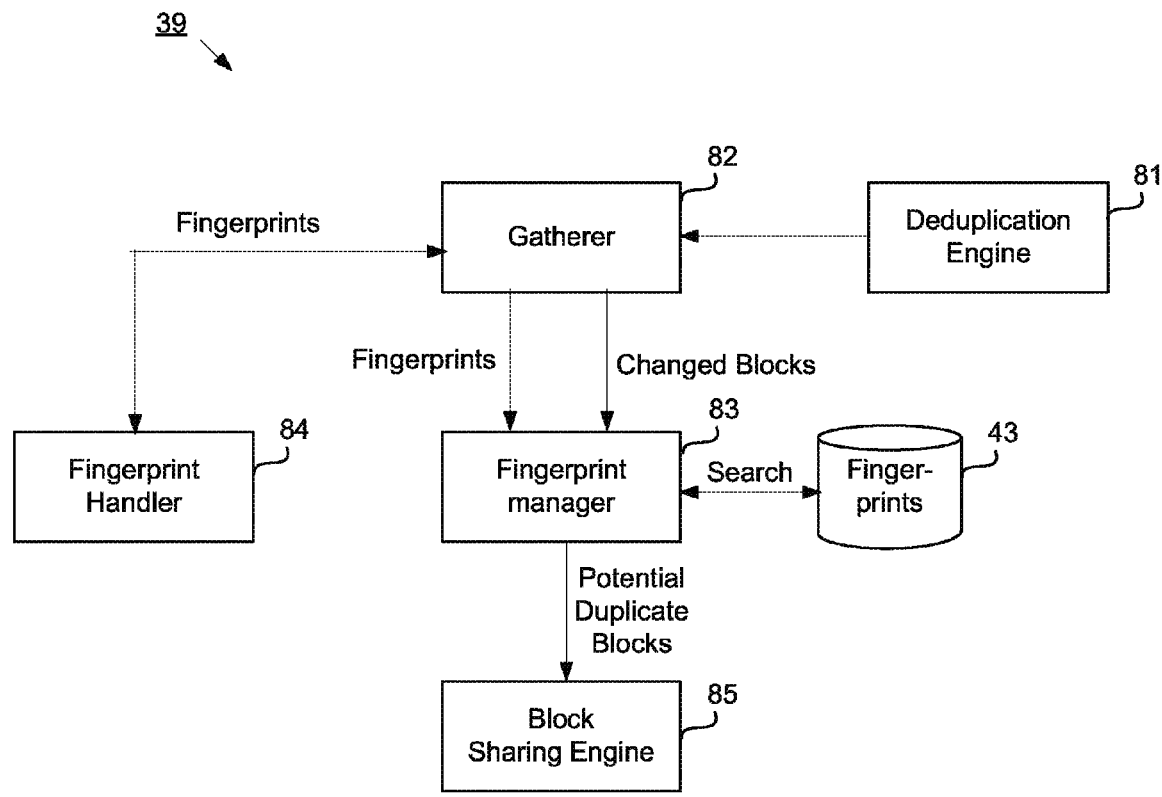
FIG. 8 illustrates elements of a de-duplication module.

FIG. 8 illustrates elements of the de-duplication module 39, according to certain embodiments of the invention. The elements include a de-duplication engine 81, a gatherer module 82, a fingerprint manager 83, a fingerprint handler 84 and a block sharing engine 85. The fingerprints database 43 stores the fingerprints of all data blocks that have been written to the storage subsystem 4, as noted above. In certain embodiments, each fingerprint is a checksum, such as an MD5 checksum. Each block has a separate entry in the fingerprints database 43. Each such entry includes the fingerprint of the block, the inode number of the file to which the block belongs, and the FBN of the block.

The fingerprint handler 84 is responsible for computing the fingerprints of data blocks. The gatherer module 82 is responsible for identifying new data blocks and for triggering the fingerprint handler 84 to compute fingerprints of the new data blocks and return them to the gatherer module 82. The fingerprint manager 83 receives the fingerprints of the new data blocks from the gatherer module 82 and updates the fingerprints database 43 to include entries for those data blocks. The fingerprint manager 83 is also responsible for identifying potentially duplicate data blocks, by finding entries with matching fingerprints in the fingerprints database 43. The block sharing engine 85 is responsible for comparing potentially duplicate data blocks identified by the fingerprint manager 83 to identify actual duplicate data blocks, and for calling functions of the file system 31 when appropriate to eliminate duplicate data blocks and implement block sharing. For performance reasons, multiple block share operations may be ongoing at any given time. The de-duplication engine 81 schedules and triggers operations of the other modules. In particular, the de-duplication engine 81 triggers operation of the gatherer module 82, which may be done according to a pre-specified schedule, timing algorithm, or in response to a manual input.

Figure 9:
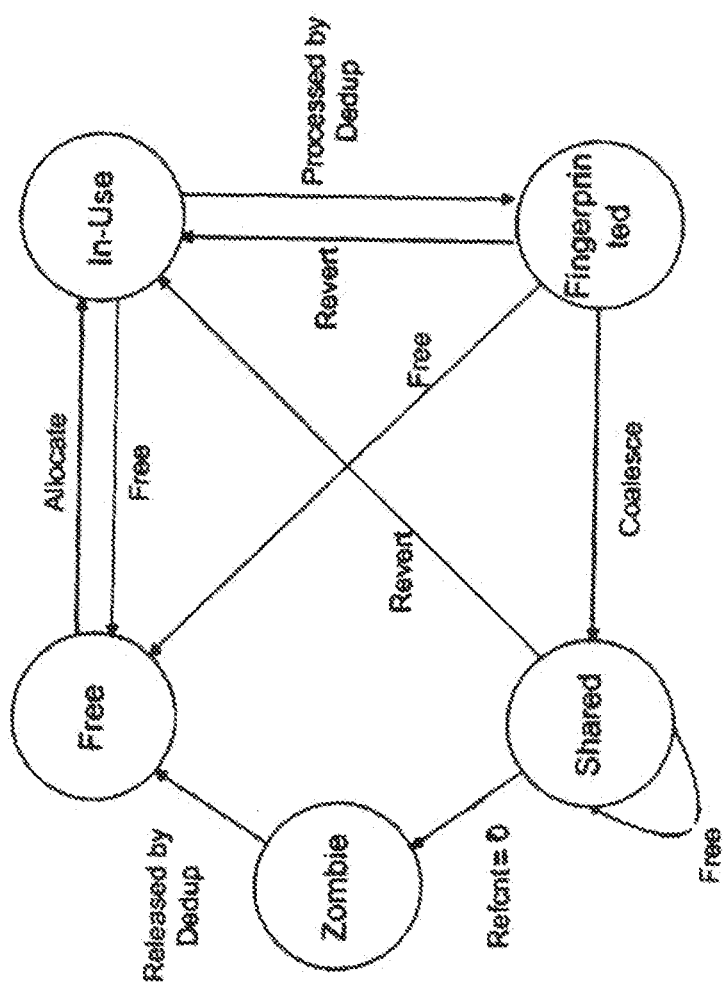
FIG. 9 is a state diagram showing the states which a data block can have.

According to certain embodiments of the invention, at any particular point in time a block will be in one of the following states: free, in-use, fingerprinted, shared, and zombie. A free block is a block that is not being used (not allocated). An in-use block is a block that is being used and has not yet been processed by the de-duplication operation. A fingerprinted block is a block that has been processed by the de-duplication operation, and for which an entry has been added into the fingerprints database to track the block. A shared block is a block that has become shared and for which one or more duplicates of this block have been identified and eliminated. A zombie is a block that was shared but now is no longer used by any files, but the block has not yet been freed. FIG. 9 illustrates how a block can transition through the various states in response to various events.

Figure 10:
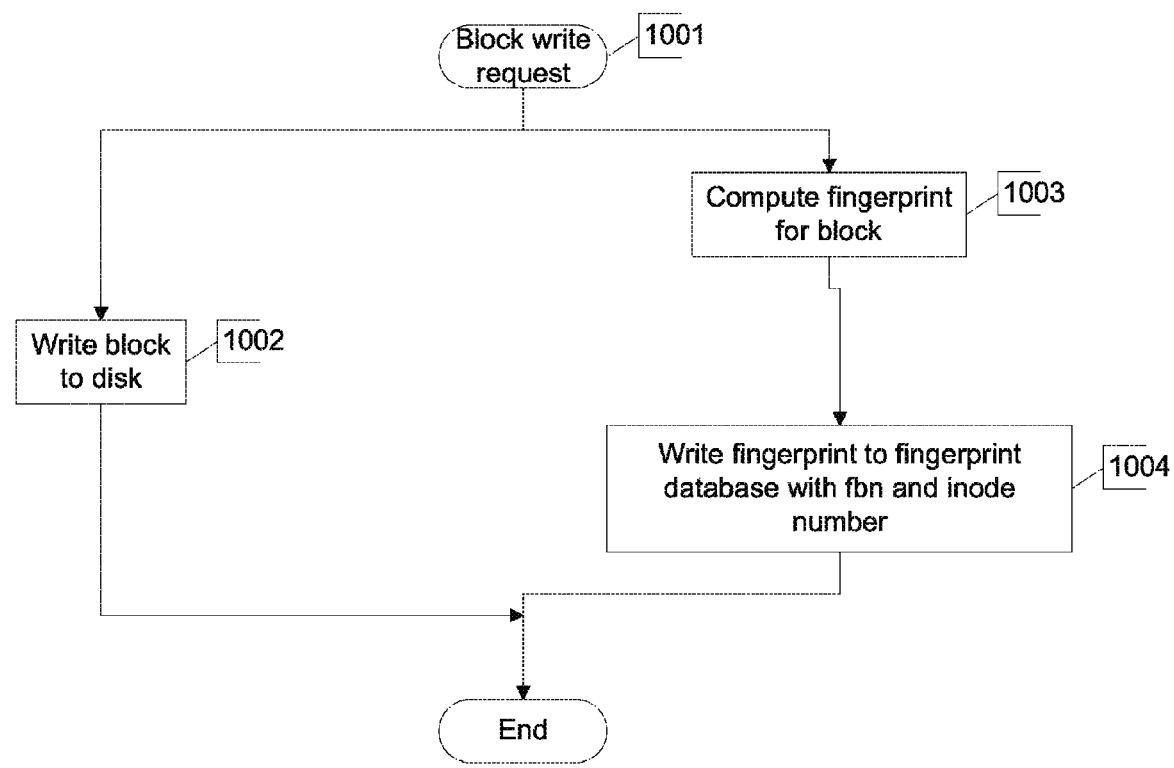
FIG. 10 is a flow diagram showing a process performed by the de-duplication module when a block is written to disk.

FIG. 10 shows a process performed by the de-duplication module 39 when a block is written to disk. In response to a request to write a block at 1001, the fingerprint handler 84 computes a fingerprint for the block at 1003. The fingerprint is passed to the fingerprint manager 83, which writes an entry for the block into the fingerprints database 43 at 1004 including the fingerprint, the FBN, the inode number of the block, and other relevant context information that is specific to this block, such as the value of a consistency point counter at the time the block was written to disk. These operations 1003 and 1004 are performed concurrently with the operation of writing 1002 the blocks to the storage subsystem 4. In alternative embodiments, however, computing the fingerprint (1003) and writing the fingerprint to the fingerprints database 43 may not be performed concurrently with writing the block to disk, although doing so is believed to be more efficient.

As noted above, the information saved in the fingerprints database 43 for each block includes context information, such as the value of a consistency point counter at the time the block was written to disk. This context information can be used to detect and delete "stale" fingerprints from the fingerprints database 43. Stale fingerprints are fingerprints that corresponds to blocks that have been deleted or overwritten. Entries with higher consistency point counter values are more recent than entries with lower consistency point counter values. Complementary to this functionality, information on the deleted files and/or blocks in the deletion code path is also logged and used to clean up stale entries.

Figure 11:
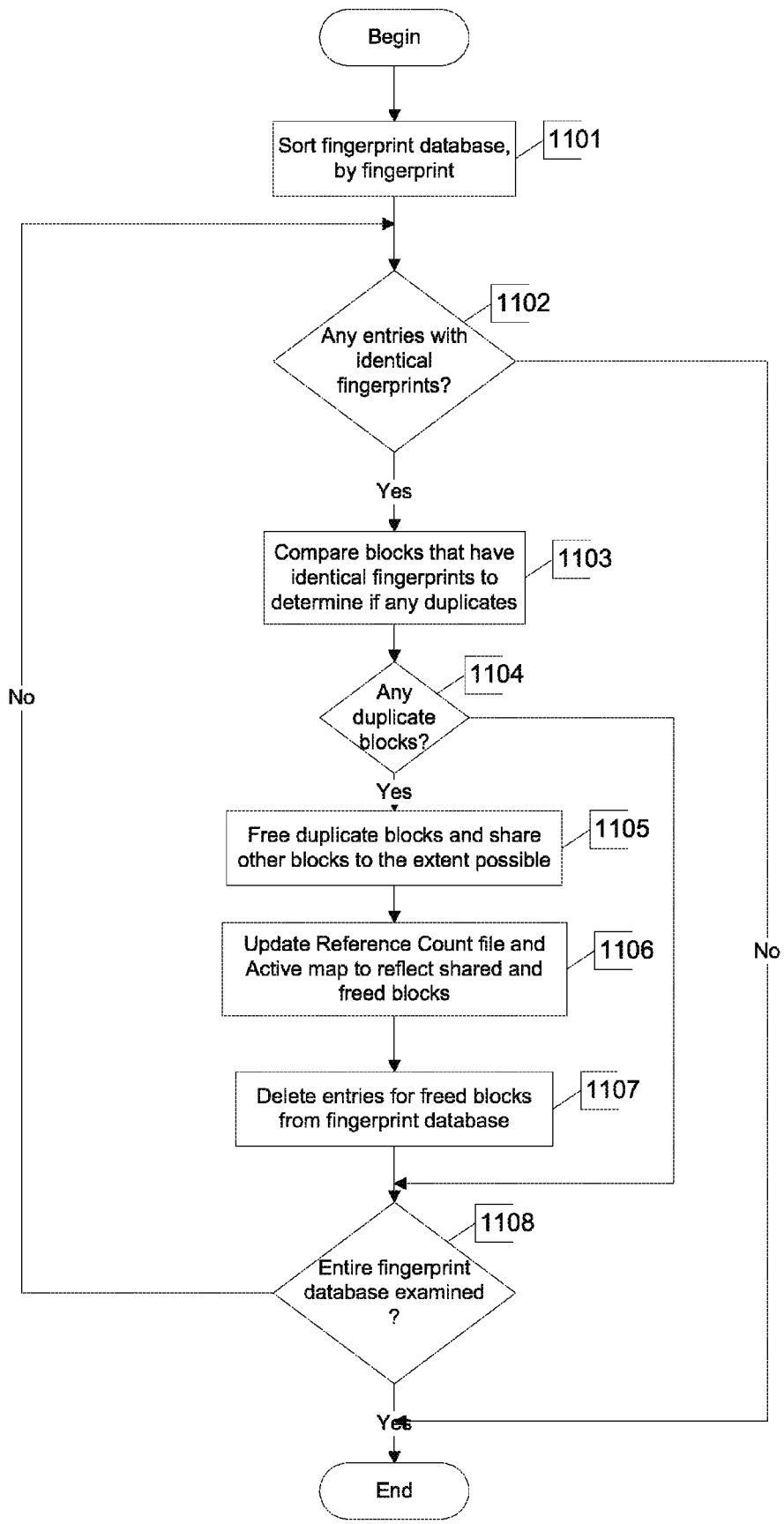
FIG. 11 illustrates a process of eliminating duplicate data blocks.

FIG. 11 illustrates the process of eliminating duplicate data blocks. In certain embodiments of the invention, the process of FIG. 11 is performed only during idle time of the file server 2 (unlike the process of FIG. 10, which is performed during writes), to avoid consuming processing resources and thereby adversely impacting system performance. At 1101 the fingerprints database is sorted, by fingerprint. Sorting the fingerprints database is optional but allows faster identification of duplicate blocks, since the entries for any duplicates will reside adjacent to each other in the fingerprints database after the sort operation is complete. At 1102 the process determines from the fingerprints database whether there are any entries with identical fingerprints. The blocks represented by any entries which have identical fingerprints are considered to be potential duplicate blocks, rather than actual duplicates, since there is always a possibility that two non-identical blocks could have the same fingerprint, regardless of the fingerprint scheme being used. If there are no entries with identical fingerprints, the process ends. If there are any entries with identical fingerprints, the process proceeds to 1103, in which the process compares the potential duplicate blocks with each other to determine if they are in fact identical. In an alternative embodiment, operation 1103 could be eliminated if an approximate verification of comparing fingerprints is deemed sufficient in determining that two blocks are identical.

If the blocks are not identical (1104), the process proceeds to 1108, described below. If the blocks are identical, then at 1105 the process frees the duplicate block or blocks so that only one instance remains of each unique block, and shares the remaining instance of the block to the extent possible. The process then updates the reference count file 41 and the Active map 42 at 1106 to reflect the newly shared and freed blocks. At 1107 the process deletes the entries for any freed blocks from the fingerprints database 43. Following either 1107 or a negative outcome of 1102, the process determines whether the entire fingerprints database 43 has been examined. If the entire fingerprints database 43 has not been examined, the process loops back to 1102 and continues as described above, until the entire fingerprints database 43 has been examined.

Note that the process of FIG. 11 can be executed in separate stages, for performance reasons. For example, the first stage can be determination 1102 of whether any entries have identical fingerprints; the second stage can be 1103 to 1106, to perform deduplication on all identified duplicate blocks. In a third stage, 1107 can be done to remove all stale entries in one pass. As such, operations within each stage can be reordered, if desired, to optimize performance.

Figure 12:
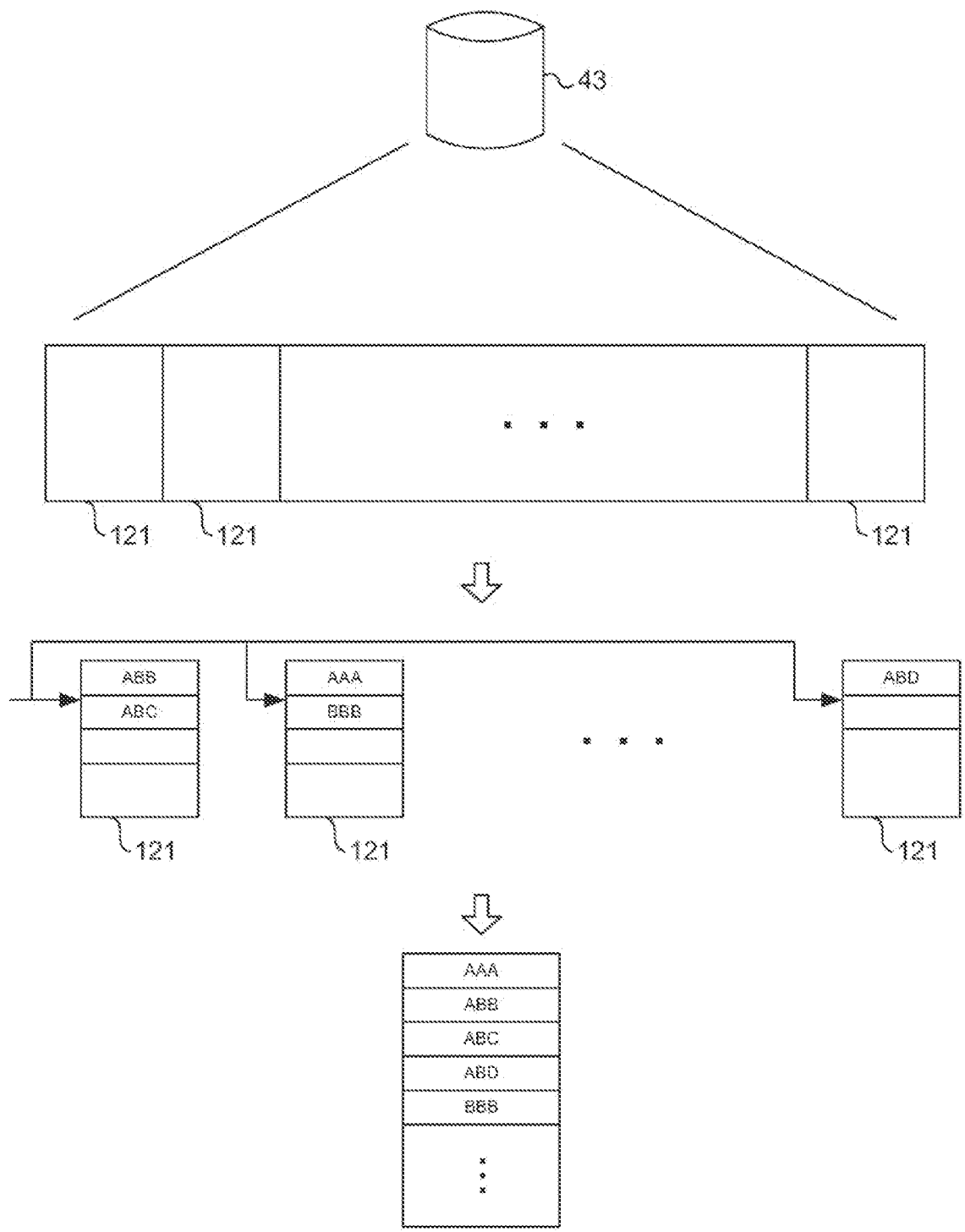
FIG. 12 illustrates a process of sorting a fingerprints database.

In certain embodiments of the invention, sorting of the fingerprints database 43 (1101 in FIG. 11) is done in the following manner, as illustrated in FIG. 12. First, the fingerprints database is divided into some number, N, of approximately equal-sized chunks 121. Each of the N chunks 121 is then independently sorted by fingerprint value, using any conventional sorting algorithm, such as Quicksort, for example. The algorithm then compares the fingerprints in the entries of the same rank in all of the N chunks 121 (e.g., the top entry in each of the N chunks 121) and copies the entry which has the smallest fingerprint value from among those into the next available slot in the sorted output file 122. The output file 122 becomes the sorted fingerprints database 43 when the sorting operation is complete. This process is then repeated until all of the entries in the N sorted chunks 121 have been copied into the output file 122.

Figure 13:
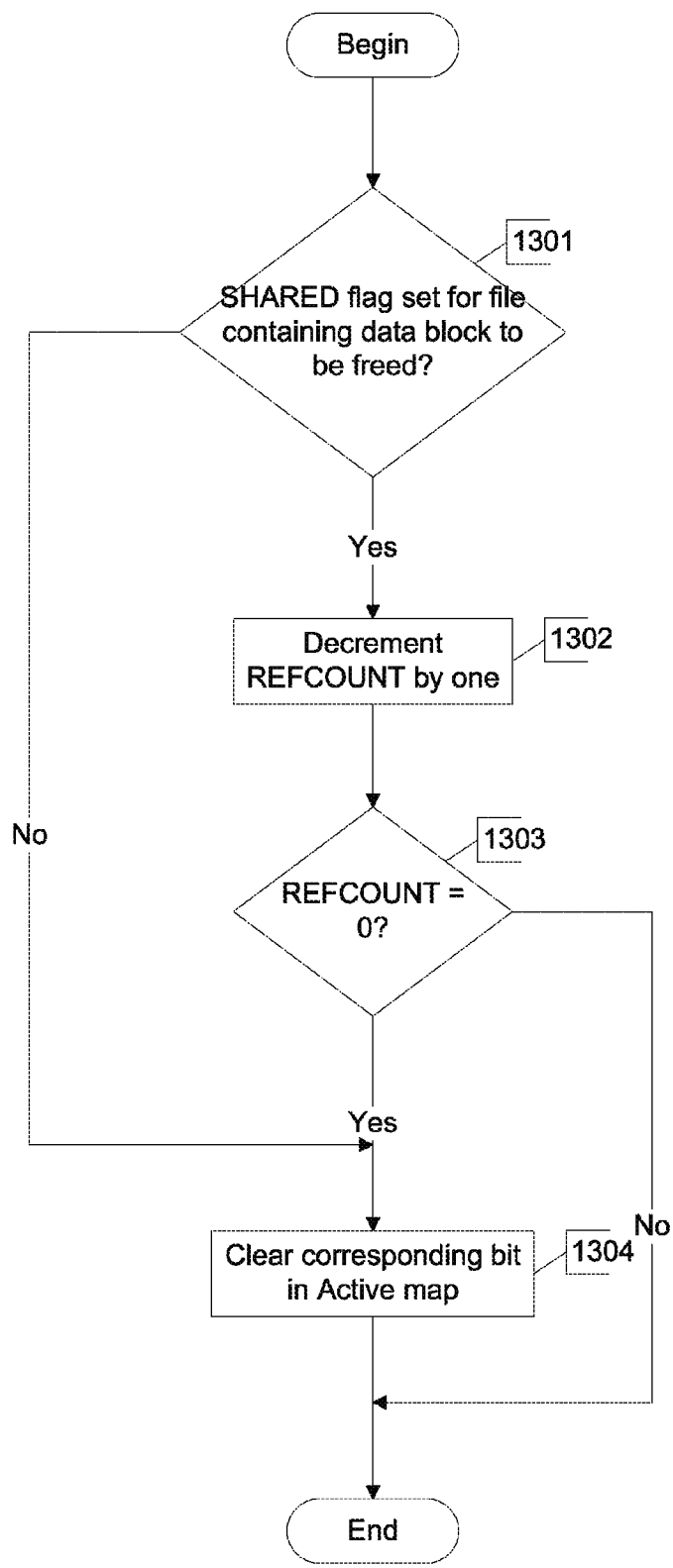
FIG. 13 is a flow diagram showing the process of freeing a data block.

FIG. 13 illustrates in greater detail the operation of freeing a data block, such as a duplicate block. At 1301 the process determines whether the SHARED flag is set for the file which contains the block to be freed. If the SHARED flag is not set (meaning that no blocks in the file are shared), the process proceeds to 1304, in which the bit corresponding to the block is cleared in the Active map 42. The process then ends. If the SHARED flag is not set at 1301, then at 1302 the process decrements the REFCOUNT value for the block by one in the reference count file 41. After decrementing the REFCOUNT value, the process determines at 1303 whether the REFCOUNT value is zero. If the REFCOUNT value is zero (meaning that the block is no longer used), the process clears the corresponding bit in the Active map 42 and then ends. If the REFCOUNT value is determined to be non-zero at 1303, the process simply ends.

In certain embodiments, the system also maintains a change log 44 (FIG. 3) to identify blocks that are new or modified since the last time the process of FIG. 11 was executed. The change log 44 contains information of the same type as the fingerprints database 43 (i.e., fingerprint of the block, inode number of the file to which the block belongs, and the FBN of the block), but only for new or modified blocks. From time to time, the system then re-executes the sorting process of FIG. 12 on both the fingerprints database 43 and the change log 44, to merge the change log 44 into the fingerprints database 43.

In alternative embodiments, rather than using the techniques of FIGS. 11 and 12 to identify and eliminate duplicate data blocks, the system could simply from time to time scan the entire file system, compute the fingerprints of all data blocks, and eliminate duplicates at essentially the same time. However, the technique described above is believed to be more efficient.

Thus, a method and apparatus for identifying and eliminating duplicate data blocks and for sharing data blocks have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
in response to a write request for a first file in a hierarchical file system in a storage server, allocating a first data block and writing the first data block to storage in accordance with the write request;
concurrently with writing the first data block to storage, computing a first fingerprint from content of the first data block and updating a fingerprint database with an entry that indicates the first fingerprint, the first file, and the first data block;
determining that the first data block and a second data block in the hierarchical file system are duplicates of each other, wherein determining that the first data block and the second data block are duplicates comprises,
determining that the fingerprint database includes a second fingerprint that matches the first fingerprint, wherein the fingerprint database includes an entry that indicates the second fingerprint, a second file, and the second data block;
sharing the second data block among the first and second files in the hierarchical file system in response to the determining that the first and second data blocks are duplicates of each other; and
eliminating the first data block from the hierarchical file system.

2. The method of claim 1, wherein determining that the first and second data blocks are duplicates of each other further comprises determining that content of the first data block and content of the second data block are the same after determining that the first and the second fingerprints match.

3. The method of claim 2, wherein determining that content of the first data block and content of the second data block are the same comprises:
performing a block comparison of the content of the first and second data blocks.

4. The method of claim 1, wherein sharing the second data block among the first and second files comprises:
referencing the first data block from both the first and second files with pointers.

5. The method of claim 4, further comprising:
for an operation that converts the hierarchical file system to a file system without sharing, determining shared data blocks;
for each of the shared data blocks, creating a copy;
for each of the shared data blocks, decrementing a reference count associated with the shared data block; and
for a set of files with pointers to the shared data blocks, modifying the pointers to reference corresponding ones of the copies of the shared data blocks instead of the shared data blocks.

6. The method of claim 1, further comprising:
replicating at least a portion of the hierarchical file system to a remote destination including replicating the first and second files, wherein the replicating includes copying the second data block to the remote destination only once for both the first and second files.

7. The method of claim 1, further comprising determining stale entries for removal from the fingerprint database based, at least in part, on block deletion information and consistency point counters in the fingerprint database, wherein updating the fingerprint database with the entry comprises updating the entry to also indicate a consistency point counter.

8. The method of claim 1, wherein determining that the first and second data block are duplicates further comprises sorting the fingerprint database after updating the fingerprint database, wherein determining that the fingerprint database includes a second fingerprint that matches the first fingerprint comprises comparing entries of the fingerprint database as sorted.

9. The method of claim 1 further comprising performing the writing of the first data block to storage in accordance with copy on write if a reference counter of the first data block is greater than one.

10. A non-transitory computer readable storage medium having program code for data block deduplication stored thereon the program code comprising instructions to:
in response to a write request for a first file in a hierarchical file system in a storage server, allocate and write a first data block to storage in accordance with the write request;
concurrently with writing the first data block to storage, compute a first fingerprint from content of the first data block and update a fingerprint database with an entry that indicates the first fingerprint, the first file, and the first data block;
determine whether the first data block and a second data block in the hierarchical file system are duplicates of each other, wherein the instructions to determine whether the first data block and the second data block are duplicates comprise instructions to,
determine whether the fingerprint database includes a second fingerprint that matches the first fingerprint, wherein the fingerprint database includes an entry that indicates the second fingerprint, a second file, and the second data block;

share the second data block among the first and second files in the hierarchical file system in response to a determination that the first and second data blocks are duplicates of each other; and eliminate the first data block from the hierarchical file system.

11. The non-transitory computer readable storage medium of claim 10, wherein the instructions to determine that the first data block and the second data block are duplicates comprise instructions to performing a block comparison of data blocks that have matching fingerprints.

12. The non-transitory computer readable storage medium of claim 10, wherein the instructions to share the second data block among the first and second files comprises instructions to reference the second data block from both the first and second files with pointers.

13. The non-transitory computer readable storage medium of claim 10, wherein the program code further comprises instructions to determine stale entries for removal from the fingerprint database based, at least in part, on block deletion information and consistency point counters in the fingerprint database, wherein the instructions to update the fingerprint database with the entry comprises instructions to update the entry to also indicate a consistency point counter.

14. The non-transitory computer readable storage medium of claim 10, wherein the instructions to determine that the first and second data block are duplicates further comprise instructions to sort the fingerprint database after update of the fingerprint database, wherein the instructions to determine whether the fingerprint database includes a second fingerprint that matches the first fingerprint comprise instructions to compare entries of the fingerprint database as sorted.

15. The non-transitory computer readable storage medium of claim 10, wherein the program code further comprises instructions to perform the write of the first data block to storage in accordance with copy on write if a reference counter of the first data block is greater than one.

16. A file server comprising:
storage adapter hardware to couple to a storage subsystem including one or more mass storage devices that store data;
a processor;
an operating system configured for execution by the processor including file system and a de-duplication program code, wherein the de-duplication program code comprises instructions executable by the processor to cause the file server to,
concurrently with the file system servicing a write request to write a first data block for a first file in a hierarchical file system in the file server, compute a first fingerprint from content of the first data block and update a fingerprint database with an entry that indicates the first fingerprint, the first file, and the first data block;
determine whether the first data block and a second data block allocated by the file system are duplicates of each other, wherein the instructions to determine whether the first data block and the second data block are duplicates comprise instructions executable by the processor to cause the file server to,
determine whether the fingerprint database indicates a second fingerprint that matches the first fingerprint, wherein the second fingerprint is computed from the second data block;
in response to a determination that the first data block and the second data block are duplicates of each other, share the second data block among the first file and a second file in the file system, wherein the second file is associated with the second data block; and
mark the first data block for elimination from the file system.

17. The file server of claim 16, wherein the de-duplication program code further comprises instructions executable by the processor to cause the file server to maintain a fingerprint for written data blocks in the file system; and
detect duplication data blocks at least in part by comparing data block fingerprints.

18. The file server of claim 16, wherein the file system program code comprises instructions generate pointers from a clone file to shared data blocks pointed to by a third file, and increase a reference count associated with data blocks of a fourth file to indicate new active references from the clone file.

19. The file server of claim 16, wherein the de-duplication program code further comprises instructions executable by the processor to cause the file server to determine stale entries for removal from the fingerprint database based, at least in part, on block deletion information and consistency point counters in the fingerprint database, wherein the instructions to update the fingerprint database with the entry comprises instructions executable by the processor to cause the file server to update the entry to also indicate a consistency point counter.

20. The file server of claim 16, wherein the instructions to determine that the first and second data block are duplicates further comprise instructions executable by the processor to cause the file server to sort the fingerprint database after update of the fingerprint database, wherein the instructions to determine whether the fingerprint database includes a second fingerprint that matches the first fingerprint comprise instructions executable by the processor to cause the file server to compare entries of the fingerprint database as sorted.

21. The file server of claim 16, wherein the file system program code further comprises instructions to perform servicing of the write request in accordance with copy on write only if a reference counter of a corresponding data block is greater than one.

* * * * *